Patented Dec. 19, 1933

1,940,645

UNITED STATES PATENT OFFICE 1,940,645

MANUFACTURE OF BITUMINOUS PAVING MATERIAL

Robert P. Fletcher, Jr., Wilmington, Del.

No Drawing. Application March 7, 1932
Serial No. 597,423

1 Claim. (Cl. 94—23)

In general, my invention relates to that class of pavements comprising irregularly shaped mineral fragments, which class includes as types the pavements known as broken stone, sand, gravel, slag, macadam, concrete, and the like, in which the material used to coat the surfaces of the fragments, in the completed pavement, is of a plastic nature at the time the pavement is laid and so remains, to a greater or less degree, through the life of the pavement, the most commonly used of such plastic or semi-solid materials being the asphalt and tar paving cements and road binders.

In particular, my invention relates to the special type of the aforementioned class of pavements in which the pavement mixtures are transported, handled and laid cold, and in which the mixtures are usually prepared by applying to the surfaces of cold or but slightly warmed mineral fragments a priming and temporary fluxing coat of light volatile oil such as gasoline, naphtha, kerosene, light fuel or burning oil, and the like, and thereafter as a separate addition applying the coating of the plastic cement in a sufficiently fluid condition to coat the light oil primed fragments.

According to my invention, in the manufacture of paving mixtures of the above class, I further add to the mixture as another addition, with proper compensations in the general design, a tempering asphalt of harder or stiffer consistency than the plastic cements now in general use. By means of this addition I provide in the pavement, when laid and compacted on the road, a binding plastic cement which is so tempered by this new element that it has acquired additional qualities of value such as, higher melting point, lower penetration, less susceptibility to temperature changes, lower co-efficient of expansion, and greater stability.

A pavement which contains such a cementing medium has important advantages; including a lesser tendency to "bleed" at the surface, and a better retention of its non-skid surface.

Heretofore irregularly shaped mineral fragments, such as broken stone and the like, have been first primed with a light volatile mineral oil, naphtha or the like, and the primed fragments have been then coated with ordinary asphalt paving cement; after which hydrated lime or the like, and then dampened sand or crusher screenings or the like, improperly called "mineral filler", may or may not have been added. It has, however, been customary to use as the ordinary asphalt paving cement a softer material than most desirable in the finished pavement, in order that the handling and laying cold might not be too difficult.

In practicing my invention, I add another bituminous material, a third, so that the composition comprises the broken stone and possibly other mineral matter, to which is added:

1. The light mineral priming or priming and temporary fluxing oil or oils.
2. The asphalt paving cement of ordinary quality, forming the body of the cementing medium.
3. The now new element of a tempering asphalt, the function of which is to stiffen and otherwise improve, in the presence of the volatilizing light mineral oil, the softer asphalt cement of former use. These three additions should be made separately and in the order named.

In case a non-volatile priming oil is used, then usually an additional light volatile temporary fluxing oil is added to the mixture at some point in the process; which may be done just after the application of the priming oil, or at any time thereafter which may be considered most effective.

The new element, the harder or stiffer tempering asphalt, is usually added after the ordinary asphalt, and frequently in combination with fine mineral matter. It may be introduced as powdered asphalt, or heat liquefied asphalt, or in suspension or in part solution with either a light mineral oil or an ordinary asphalt. I have successfully used for the addition of tempering asphalt a blown asphalt of from 5 to 30 penetration and in amount to constitute from 10% to 20% of the asphaltic content of the pavement; but this addition may or may not be a blown asphalt; thus, for example, a hard native asphalt such as gilsonite may be employed and the proportion may vary with circumstances.

My preferred method is to introduce the new element in powdered form, with or without an accompaniment of fine mineral matter, after the ordinary asphalt cement, and sometimes after the optional additions of hydrated lime and other fine mineral matters such as crusher dust or sand, since I find that this procedure both retards the gradual fluxing of the two asphalts and then speeds it up at the proper time, which is after the mixture is spread and compacted on the road, by the then rapid passing out of the light volatile fractions of the temporary liquefying oil and the rapid fluxing of the asphalts which accompanies such passing.

Another method is to first prime the mineral aggregate, crushed stone or the like, with a non-volatile or but slightly volatile oil of good dispersive quality, using, if desired, known special ingredients to produce the dispersive characteristic to the most desirable extent practicable, then to add the ordinary asphalt paving cement, then the tempering asphalt, and finally light volatile mineral oil to produce the temporary plasticity for the period required for transporting, handling and laying, fine filler material also being used if desired; and even part of the light oil may be added just before the hard asphalt, and some useful effect will be obtained.

The resulting pavement wearing surface is one of the type described, which has for its cementing medium a plastic asphaltic material which while both adhesive and resilient, is also tempered and firm and exceptionally resistant to the heat of summer and to the cold of winter alike, because of such characteristics as high melting point, lowered co-efficient of expansion, and its much less likelihood to give trouble because of "bleeding" and the accompanying fat spots on the surface.

By my invention, this result of tempering the asphalt cementing medium is accomplished without too much affecting the workability of the mixture, since during the transportation, handling, spreading and laying, the third bituminous material, i. e., the harder or stiffer tempering asphalt, has none or not more than a slight tempering action upon the softer asphalt. The tempering is only started at an accelerated rate after the material is spread on the road and the liquefier begins to pass out through the exposed road surface, drawn by the heat of the sun and assisted as it is by the kneading action of traffic. Then it is that the final fluxing or tempering of an ordinary asphalt by a harder asphalt takes place.

Having thus described my invention, I claim:

The process of manufacturing bituminous pavement which consists in adding to the mineral aggregate first a volatile temporary fluxing oil; and then as a separate addition an ordinary bituminous paving cement; and then as a further addition a bituminous tempering material consisting of a hard powdered asphalt or gilsonite; and mixing these elements and laying the pavement before complete coalescence.

ROBERT P. FLETCHER, Jr.